(12) United States Patent
Lee et al.

(10) Patent No.: US 9,357,595 B2
(45) Date of Patent: May 31, 2016

(54) LIGHT EMITTING DIODE DRIVER

(71) Applicant: SAMSUNG ELECTRO-MECHANICS CO., LTD., Suwon-Si, Gyeonggi-Do (KR)

(72) Inventors: Keun Wook Lee, Suwon-Si (KR); Byoung Woo Ryu, Suwon-Si (KR)

(73) Assignee: Solum Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/514,166

(22) Filed: Oct. 14, 2014

(65) Prior Publication Data

US 2015/0115824 A1 Apr. 30, 2015

(30) Foreign Application Priority Data

Oct. 31, 2013 (KR) .................... 10-2013-0131559

(51) Int. Cl.
| | |
|---|---|
| H05B 33/08 | (2006.01) |
| H02M 7/06 | (2006.01) |
| H02J 3/00 | (2006.01) |
| H02M 3/158 | (2006.01) |
| H02M 3/335 | (2006.01) |
| H02M 7/10 | (2006.01) |
| H02M 7/5383 | (2007.01) |
| H02J 5/00 | (2016.01) |
| H02J 7/02 | (2016.01) |
| H02J 7/34 | (2006.01) |

(52) U.S. Cl.
CPC ............ *H05B 33/0809* (2013.01); *H02J 5/005* (2013.01); *H02J 7/025* (2013.01); *H02J 7/345* (2013.01); *H02M 3/158* (2013.01); *H02M 3/33507* (2013.01); *H02M 3/33523* (2013.01); *H02M 7/103* (2013.01); *H02M 7/5383* (2013.01); *H05B 33/0815* (2013.01); *H05B 33/0851* (2013.01)

(58) Field of Classification Search
None
See application file for complete search history.

(56) References Cited

U.S. PATENT DOCUMENTS

| 5,675,485 | A | * | 10/1997 | Seong ........................... 363/97 |
|---|---|---|---|---|
| 6,122,180 | A | * | 9/2000 | Seo et al. ................... 363/21.17 |
| 6,486,627 | B1 | * | 11/2002 | Gabrys ......................... 318/161 |
| 2007/0036576 | A1 | * | 2/2007 | Cho et al. ........................ 399/88 |
| 2009/0251120 | A1 | * | 10/2009 | Kim et al. ..................... 323/288 |
| 2010/0052554 | A1 | * | 3/2010 | Zanforlin ...................... 315/210 |
| 2010/0060204 | A1 | * | 3/2010 | Ohtake et al. ................. 315/307 |

FOREIGN PATENT DOCUMENTS

| CN | 102711339 A | * | 10/2012 |
|---|---|---|---|
| JP | 2000-188867 A | | 7/2000 |
| JP | 2006-191766 A | | 7/2006 |
| JP | 2010-178594 A | | 8/2010 |
| WO | WO2013/136409 | * | 9/2013 |

\* cited by examiner

*Primary Examiner* — Vibol Tan
(74) *Attorney, Agent, or Firm* — McDermott Will & Emery LLP

(57) ABSTRACT

A light emitting diode driver includes a power supplying unit receiving an alternating current (AC) power and outputting a transformed power according to a predetermined ratio, a rectifying unit rectifying the output power from the power supplying unit, and a double voltage unit receiving the rectified power from the rectifying unit and generating an output voltage such that the level of the output voltage is variable, and has constant duty and frequency thereof even the variance of the voltage level.

14 Claims, 6 Drawing Sheets

LIGHT EMITTING DIODE DRIVER

CROSS-REFERENCE TO RELATED APPLICATION

This application claims the benefit of Korean Patent Application No. 10-2013-0131559 filed on Oct. 31, 2013, with the Korean Intellectual Property Office, the disclosure of which is incorporated herein by reference.

BACKGROUND

The present n disclosure relates to a light emitting diode driver capable of driving a light emitting diode by converting power into driving power for driving the light emitting diode.

A light emitting diode (LED), a semiconductor device provided with a p-n junction structure and emitting light through the recombination of electrons and holes has recently been applied to various fields in accordance with the development of a semiconductor technology. Particularly, since LEDs have higher degrees of efficiency and longer lifespans and are more eco-friendly as compared with existing light emitting devices, the fields of application of LEDs have been continuously expanded.

Meanwhile, as applications of LED lighting devices have increased and voltage and current specifications of the LED lighting devices have been diversified, a demand exists for development of a controller according to LED characteristics. The voltage and current specifications of an LED string is determined by a combination of the LEDs and a wide range of voltage is required to control the LED string having various combinatory forms.

SUMMARY

An aspect of the present disclosure may provide a light emitting diode driver capable of varying a voltage provided to a light emitting diode while maintaining a duty and a frequency of a switch disposed at a primary side.

An aspect of the present disclosure may also provide a light emitting diode driver capable of being operated with high efficiency.

An aspect of the present disclosure may also provide a light diode driver, robust with respect to changes in an LED voltage.

According to an aspect of the present disclosure, a light emitting diode driver may include: a power supplying unit including a primary winding, and a secondary winding electrically insulated from the primary winding and receiving power according to a preset winding ratio between the primary winding and the secondary winding; a rectifying unit rectifying the power received by the secondary winding; and a double voltage unit multiplying a voltage supplied by the rectifying unit based on a voltage supplied to a light emitting diode by the rectifying unit.

The rectifying unit may include: a first diode and a second diode connected to each other in series; and a third diode and a fourth diode connected to each other in series, wherein the first and second diodes and the third and fourth diodes are connected to each other in parallel.

The double voltage unit may be connected to at least one of the first diode to the fourth diode in parallel.

The double voltage unit may include: a capacitor element; and a double voltage switching unit connected to the capacitor element in series.

The light emitting diode driver may further include: a double voltage controlling unit obtaining information regarding a level of the voltage supplied to the light emitting diode by the rectifying unit, and controlling the double voltage switching unit based on the information regarding the level of the voltage.

The double voltage controlling unit may turn the double voltage switching unit on when a level of the voltage supplied to the light emitting diode by the rectifying unit exceeds a predetermined level.

The double voltage controlling unit may turn the double voltage switching unit off when a level of the voltage supplied to the light emitting diode by the rectifying unit is equal to or lower than a predetermined level.

The double voltage controlling unit may have hysteresis characteristics.

The double voltage controlling unit may include a Schmitt trigger circuit.

The double voltage controlling unit may include a voltage dividing unit dividing the voltage supplied to the light emitting diode by the rectifying unit, and the voltage divided by the voltage dividing unit may be applied to the double voltage switching unit.

According to another aspect of the present disclosure, a light emitting diode driver including a rectifying unit may include: a double voltage controlling unit detecting a voltage supplied to a light emitting diode; and a double voltage unit multiplying a voltage supplied to the light emitting diode driver by the rectifying unit based on the voltage supplied to the light emitting diode.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
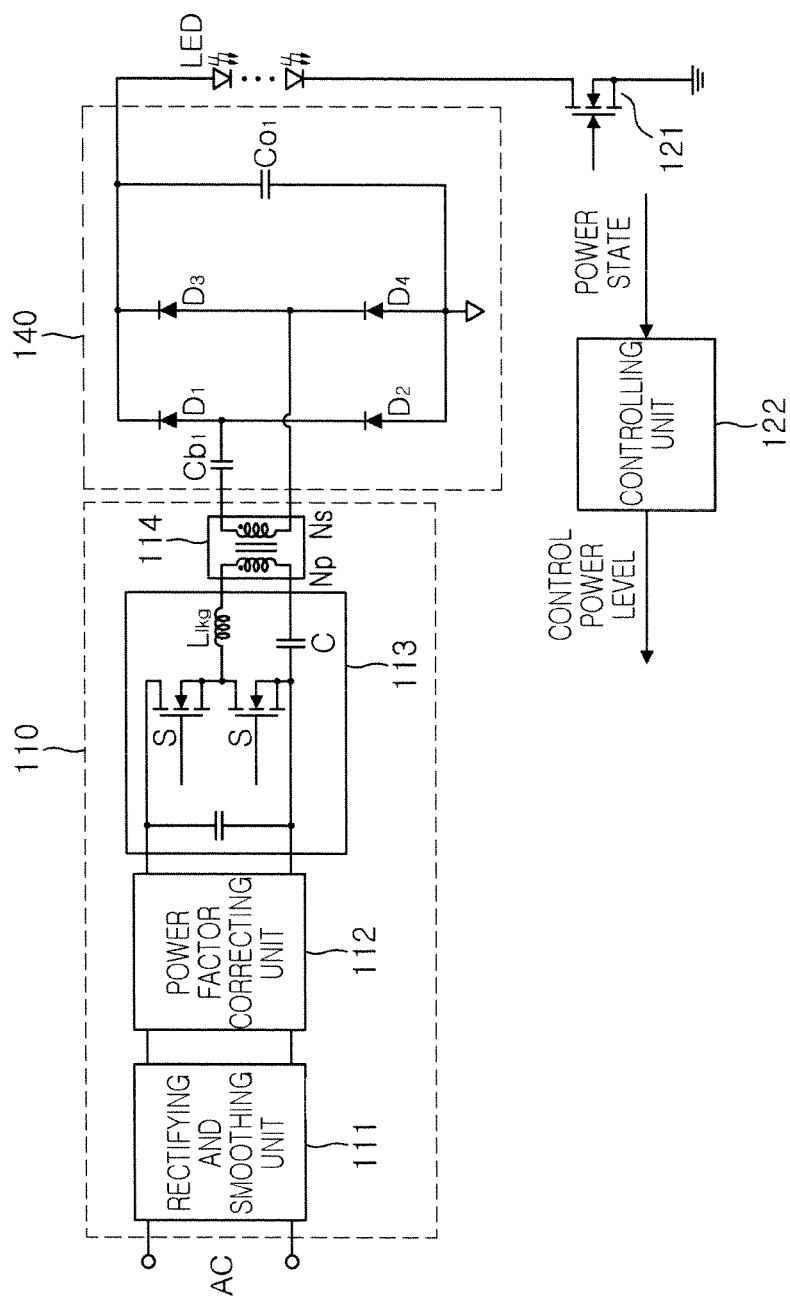
FIG. 1 is a schematic diagram of a general light emitting diode (LED) driver.

Hereinafter, embodiments of the present disclosure will be described in detail with reference to the accompanying drawings.

The disclosure may, however, be embodied in many different forms and should not be construed as being limited to the embodiments set forth herein.

Rather, these embodiments are provided so that this disclosure will be thorough and complete, and will fully convey the scope of the disclosure to those skilled in the art. Throughout the drawings, the same or like reference numerals will be used to designate the same or like elements.

FIG. 1 is a schematic diagram of a general light emitting diode (LED) driver 100.

Referring to FIG. 1, the LED driver 100 may include a power supplying unit 110, a controlling unit 122, a second switching unit 121, and a rectifying unit 140.

The power supplying unit 110 may include a rectifying and smoothing unit 111 receiving alternating current (AC) power and rectifying and smoothing the received AC power, a power factor correcting unit 112 adjusting a phase difference between a voltage and a current of the power rectified by the rectifying and smoothing unit 111 to correct a power factor, a first switching unit 113 switching the power having the power factor outputted from the power factor correcting unit 112, and a transformer 114 varying a voltage level of the power outputted from the first switching unit 113. Although not shown, the power supplying unit 110 may further include an electromagnetic interference (EMI) filter to remove EMI.

The first switching unit 113 may be configured as an LLC resonance inverter including two switches connected to each other in series and alternately switching the power having the power factor outputted from the power factor correcting unit 112, and having leakage inductance $L_{lkg}$ and a resonance capacitor C.

Figure 2A:
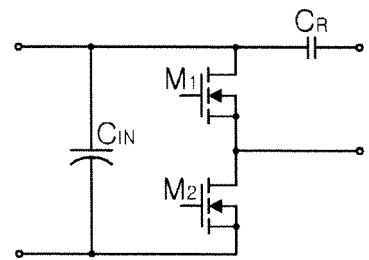
FIGS. 2A through 2C are diagrams showing examples of a switching unit, adopted in a light emitting diode driver.
Figure 2B:
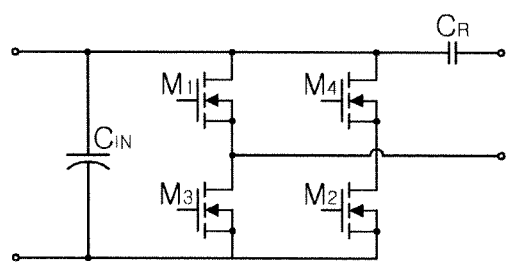
Figure 2C:
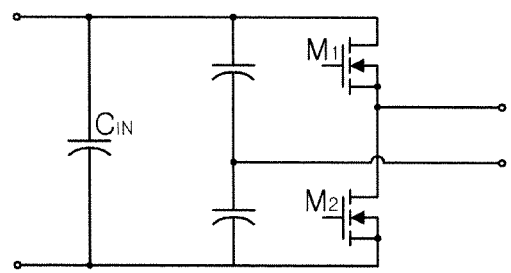

FIGS. 2A through 2C are diagrams showing examples of a switching unit 113, adopted in a light emitting diode driver.

As shown in FIGS. 2A through 2C, the examples of the first switching unit 113, adopted in the light emitting diode driver may be a half bridge inverter (see FIG. 2A), a full-bridge inverter (see FIG. 2B), a push-pull inverter (see FIG. 2C), and the like.

The transformer 114 may include at least one primary winding Np and at least one secondary winding Ns. The primary winding Np may receive the power switched by the first switching unit 113 and the secondary winding Ns may be electrically insulated from the primary winding Np and receive the power input to the primary winding Np according to a preset winding ratio between the primary winding Np and the secondary winding Ns to thereby transform the input power to output power having a voltage level. The transformed output power may be transferred to at least one light emitting diode (LED) channel in which a plurality of LEDs are connected to each other in series.

The second switching unit 121 may be connected to the LED channel to be turned on or turned off according to a dimming signal, thereby allowing driving power to be supplied to the LED channel or blocking driving power from being provided to the LED channel.

The controlling unit 122 may control a voltage level or a current level of the power supplied to the LED channel by controlling turning-on and turning-off of the second switching unit 121 and controlling switching of the first switching unit 113 according to a state of the power supplied to the LED channel.

The rectifying unit 140 may include a capacitor Cb1, first to fourth diodes D1 to D4, and a stabilizing capacitor Co1 and may rectify and stabilize the power from the secondary winding Ns of the transformer 114 to thereby supply the driving power to the LED channel. As shown, one end of the capacitor Cb1 may be connected to one end of the secondary winding Ns, the first and second diodes D1 and D2 may be connected to each other in series, and the other end of the capacitor Cb1 may be connected to a connection point between the first and second diodes D1 and D2. The third and fourth diodes D3 and D4 may be connected to each other in series and be connected to the first and second diodes D1 and D2 in parallel, the other end of the secondary winding Ns may be connected to a connection point between the third and fourth diodes D3 and D4, and the stabilizing capacitor Co1 may be connected to the third and fourth diodes D3 and D4 in parallel.

As described above, the rectifying and smoothing unit 111, the power factor correcting unit 112, the first switching unit 113, and the primary winding Np of the transformer 114 may be formed at a primary side, and the second switching unit 121, the rectifying unit 140, and the secondary winding Ns of the transformer 114 may be formed at a secondary side.

Meanwhile, the controlling unit 122 may be formed at the primary side or the secondary side.

In a case of the light emitting diode driver according to the related art, since a specific circuit has been determined, if an output voltage is changed, a duty of the first switching unit 113 formed at the primary side may be changed, a frequency of the first switching unit 113 may be changed, or a gain of the switching unit 113 may be changed.

Ina case of a general direct current to direct current (DC/DC) converter, since an optimal design is implemented for one input and one output specification, the optimal design may be implemented only for one output voltage (a single operational duty or frequency). In addition, it is unable to implement an optimal design for various output voltages except for the optimally designed output voltage.

Recently, in order to control an LED string having various combinatory forms, a demand exists for the light emitting diode driver capable of providing a wide range of voltages. Despite the demand for the wide range of voltages, in a case in which the optimal design is implemented for only one output voltage as described above, the light emitting diode driver may not achieve a high efficiency.

Figure 3:
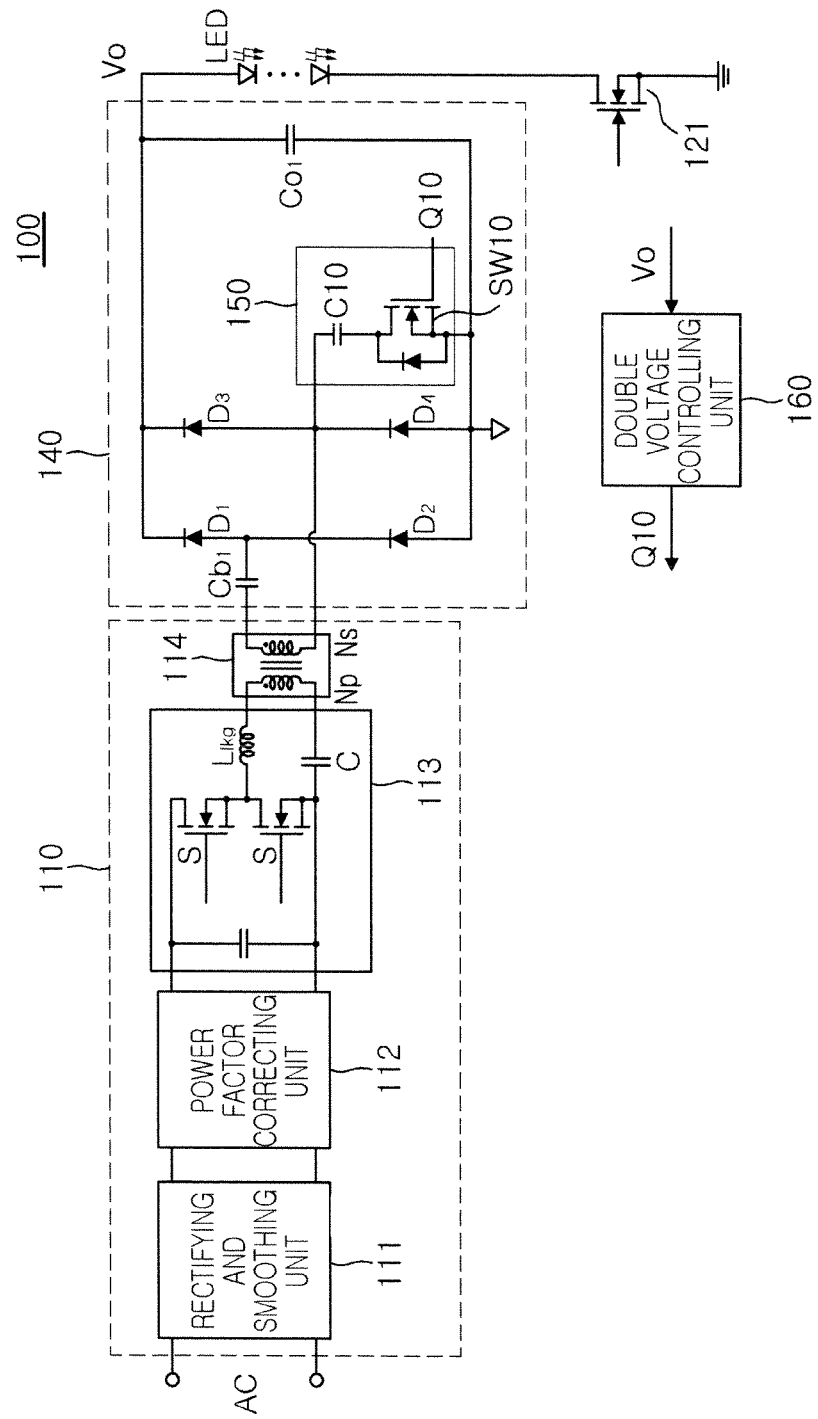
FIG. 3 is a schematic diagram of a light emitting diode (LED) driver according to an exemplary embodiment of the present invention.

FIG. 3 is a schematic configuration diagram of a light emitting diode (LED) driver according to an exemplary embodiment of the present invention.

Referring to FIG. 3, the LED driver may include the power supplying unit 110, the second switching unit 121, the rectifying unit 140, a double voltage unit 150, and a double voltage controlling unit 160.

Hereinafter, the double voltage unit 150 and the double voltage controlling unit 160 will be described in detail.

The double voltage unit 150 may multiply the voltage supplied by the rectifying unit 140 based on the voltage supplied to the LED by the rectifying unit 140.

The double voltage unit 150 may be connected to at least one of the first diode D1 to the fourth diode D4 in parallel. Referring to FIG. 3, the double voltage unit 150 may be connected to the fourth diode D4 in parallel.

The double voltage unit 150 may include a capacitor element C10 and a double voltage switching unit SW10, connected to the capacitor element C10 in series.

The double voltage controlling unit 160 may obtain information regarding a level of voltage Vo supplied to the LED by the rectifying unit 140 and may control the double voltage switching unit SW10 based on the information regarding the level of the voltage Vo. That is, the double voltage controlling unit 160 may output a switching signal Q10 for controlling the double voltage switching unit SW10.

According to an exemplary embodiment of the present invention, in a case in which a level of the voltage Vo supplied to the LED by the rectifying unit 140 is equal to or less than a predetermined voltage level, the double voltage controlling unit 160 may turn the double voltage switching unit SW10 off. In this case, the double voltage unit 150 may not be connected to the rectifying unit 140 and the rectifying unit 140 may rectify a preset voltage provided from the power supplying unit 110 and supply the rectified voltage to the LED.

In addition, in a case in which the level of the voltage Vo supplied to the LED by the rectifying unit 140 exceeds the predetermined voltage level, the double voltage controlling unit 160 may turn the double voltage switching unit SW10 on. In this case, the capacitor element C10 and the fourth diode D4 may be connected to each other in parallel, and the third diode D3 and the fourth diode D4 may not operate.

That is, the double voltage unit 150 may be connected to the rectifying unit. 140 and a double voltage circuit may be formed by the double voltage unit 150 and the rectifying unit 140.

In this case, through the double voltage unit 150 and the rectifying unit 140, the voltage supplied to the LED may be equal to twice the voltage supplied to the LED when the double voltage switching unit SW10 is turned off.

Therefore, the light emitting diode driver according to an exemplary embodiment of the present invention may change the voltage supplied to the LED while equally maintaining the duty and the frequency with respect to the switching of the primary side of the power supplying unit 110.

Further, since the light emitting diode driver according to an exemplary embodiment of the present invention operates with an optimal duty and an optimal frequency even in a case in which the voltage supplied to the LED is changed, it may operate with a high efficiency.

Figure 4:
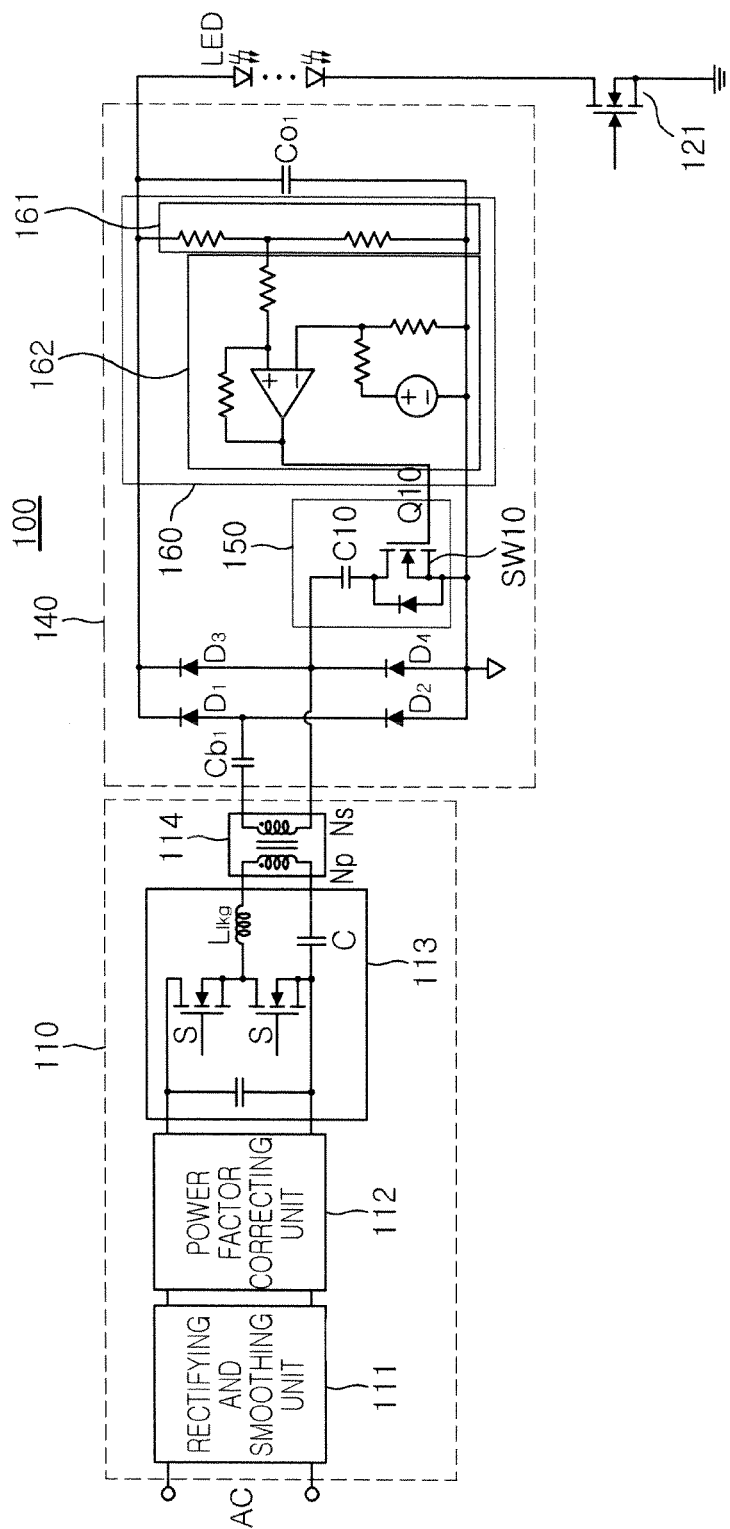
FIG. 4 is a schematic diagram of a light emitting diode (LED) driver according to another exemplary embodiment of the present invention.

FIG. 4 is a schematic configuration diagram of a light emitting diode (LED) driver according to another exemplary embodiment of the present disclosure.

Since components except for the double voltage controlling unit 160 have been described in FIG. 3, the double voltage controlling unit 160 will be described below in detail.

Referring to FIG. 4, the double voltage controlling unit 160 may include a voltage dividing unit 161 dividing the voltage supplied to the LED by the rectifying unit 140. The voltage dividing unit 161 may include a plurality of resistor elements, connected to each other in series.

The voltage divided by the voltage dividing unit 161 may be applied to the comparator.

Referring to FIG. 4, the double voltage controlling unit 160 may have hysteresis characteristics. That is, to this end, the double voltage controlling unit 160 may include a Schmitt trigger circuit 162.

Figure 5:
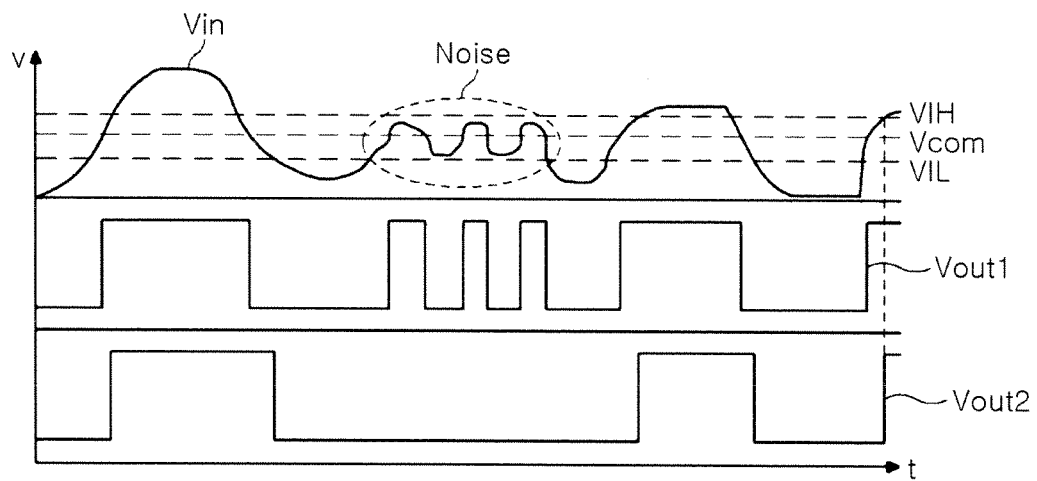
FIG. 5 is a diagram showing output waveforms of a comparator according to the presence or absence of hysteresis characteristics.

FIG. 5 is a diagram showing output waveforms of a comparator according to the presence or absence of hysteresis characteristics.

In general, the comparator, provided to compare one voltage with another reference voltage Vcom, may generate an output voltage when an input voltage is equal to or greater than a reference voltage.

Since an error is caused from the output voltage in a case in which a noise is included in the input voltage of the comparator, a comparator having hysteresis characteristics has been used to be insensitively operated to the noise.

The Schmitt trigger circuit, a comparator having hysteresis characteristics, may have an input voltage, an output voltage, and two threshold voltages VIH and VIL. Next, a description will be provided with reference to FIG. 5.

The comparator may compare an input voltage with another reference voltage Vcom and may generate the output voltage when the input voltage is equal to or greater than the level of the reference voltage Vcom.

It may be appreciated from FIG. 5 that a difference between an output waveform of the comparator having no hysteresis characteristics for the input voltage Vin and an output waveform of the comparator having hysteresis characteristics is present.

In a case in which the comparator have no hysteresis characteristics, when the input voltage Vin including a noise is input thereto, the comparator may generate an output voltage Vout1 in which the corresponding noise is reflected.

On the other hand, in a case in which the comparator has hysteresis characteristics, even when the input voltage Vin including the noise is input thereto, the corresponding noise is removed by a first threshold voltage (high threshold voltage) VIH and a second threshold voltage (low threshold voltage) VIL, such that the comparator may generate a desired output voltage Vout2. An example of the comparator having hysteresis characteristics described above is the Schmitt trigger circuit.

Since the Schmitt trigger circuit receives one input voltage Vin and compares a change in the input voltage Vin with the first threshold voltage VIH and the second threshold voltage VIL to thereby generate the output voltage Vout2, the noise of the input voltage Vin, present between the first threshold voltage VIH and the second threshold voltage VIL is not generated.

An operation of the Schmitt trigger circuit will be described in detail. When the input voltage Vin is transitioned from a low level to a high level, in a case in which the change in the input voltage Vin does not reach the first threshold voltage VIH or more, the output voltage maintains the low level, and when the input voltage Vin is transitioned from a high level to a low level, in a case in which the change in the input voltage is equal to or less than the second threshold voltage VIL, the output voltage Vout2 maintains the high level.

Referring to FIG. 4, since the light emitting diode driver according to another exemplary embodiment of the present invention includes the Schmitt trigger circuit; it may be robust with respect to changes in the LED voltage. That is, even in a case in which the voltage of the LED module is decreased according to an external dimming signal, the turn-on or off state of the switching unit SW10 of the double voltage unit may not be affected by the dimming signal. Therefore, the light emitting diode driver according to another exemplary embodiment of the present invention may be stably driven.

Figure 6:
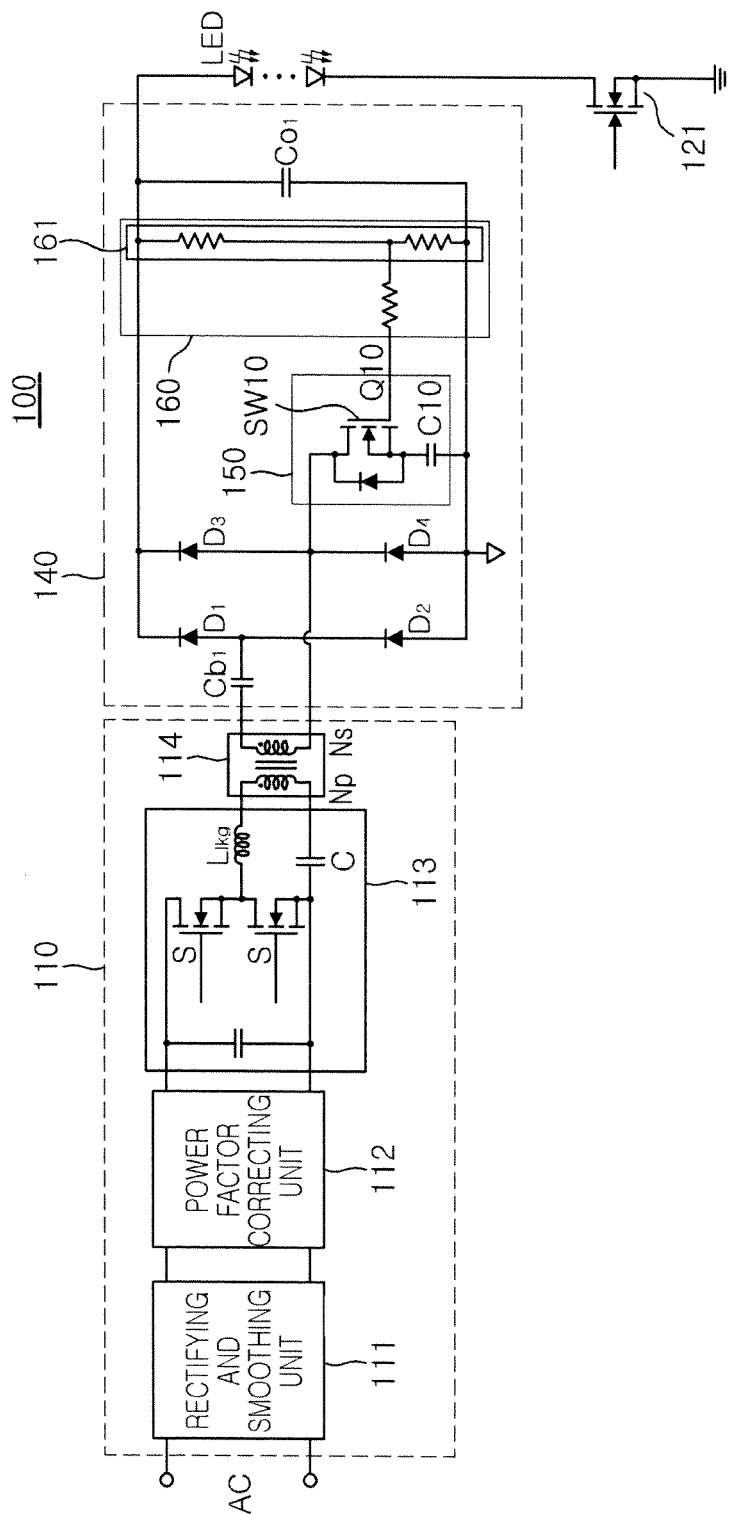
FIG. 6 is a schematic diagram of a light emitting diode (LED) driver according to another exemplary embodiment of the present invention.

FIG. 6 is a schematic diagram of a light emitting diode (LED) driver according to another exemplary embodiment of the present invention.

Since the components except for the double voltage controlling unit 160 have been described in FIG. 3, the double voltage controlling unit 160 will be described below in detail.

Referring to FIG. 6, the double voltage controlling unit 160 may include a voltage dividing unit 161 dividing the voltage supplied to the LED by the rectifying unit 140. The voltage dividing unit 161 may include a plurality of resistor elements, connected to each other in series.

The voltage divided by the voltage dividing unit 161 may be applied to the switching unit SW10.

In a case in which the voltage Vo supplied to the LED by the rectifying unit 140 has a predetermined voltage level or less, the double voltage controlling unit 160 may turn the switching unit SW10 off.

In addition, in a case in which the voltage Vo supplied to the LED by the rectifying unit 140 exceeds a predetermined voltage level, the double voltage controlling unit 160 may turn the switching unit SW10 on.

The light emitting diode driver described above may vary the voltage provided to the light emitting diode while maintaining the duty and the frequency of the switch disposed at a primary side and may be operated with a high efficiency, accordingly.

As set forth above, according to exemplary embodiments of the present invention, a light emitting diode driver capable of varying a voltage provided to a light emitting diode while maintaining a duty and a frequency of a switch disposed at a primary side may be provided.

In addition, a light emitting diode driver capable of being operated with a high efficiency may be provided.

In addition, a light diode driver, robust with respect to changes in an LED voltage may be provided.

While exemplary embodiments have been shown and described above, it will be apparent to those skilled in the art that modifications and variations could be made without departing from the spirit and scope of the present disclosure as defined by the appended claims.

What is claimed is:

1. A light emitting diode driver, comprising:
   a power supplying unit including a transformer transforming a received power to an output power according to a winding ratio of the transformer;
   a rectifying unit rectifying the output power from the power supplying unit;
   a double voltage unit including a capacitor element and a double voltage switching unit and multiplying a voltage rectified by the rectifying unit to supply an output voltage to a light emitting diode; and
   a double voltage controlling unit having hysteresis characteristics, obtaining information regarding a level of the voltage supplied to the light emitting diode by the rectifying unit, and controlling the double voltage switching unit based on the information regarding the level of the voltage supplied by the rectifying unit.

2. The light emitting diode driver of claim 1, wherein the rectifying unit includes:
   a first diode and a second diode connected to each other in series; and
   a third diode and a fourth diode connected to each other in series,
   wherein the first and second diodes and the third and fourth diodes are connected to each other in parallel.

3. The light emitting diode driver of claim 2, wherein the double voltage unit is connected to at least one of the first diode to the fourth diode in parallel.

4. The light emitting diode driver of claim 1, wherein:
   the double voltage switching unit is connected to the capacitor element in series.

5. The light emitting diode driver of claim 1, wherein the double voltage controlling unit turns the double voltage switching unit on when a level of the voltage supplied to the light emitting diode by the rectifying unit exceeds a predetermined level.

6. The light emitting diode driver of claim 1, wherein the double voltage controlling unit turns the double voltage switching unit off when a level of the voltage supplied to the light emitting diode by the rectifying unit is equal to or lower than a predetermined level.

7. The light emitting diode driver of claim 6, wherein the double voltage controlling unit includes a Schmitt trigger circuit configured to remove noise.

8. The light emitting diode driver of claim 1, wherein the double voltage controlling unit includes a voltage dividing unit dividing the voltage supplied to the light emitting diode by the rectifying unit, and
   the voltage divided by the voltage dividing unit is applied to the double voltage switching unit.

9. The light emitting diode driver of claim 1, wherein the transformer includes a primary winding receiving the received power and a secondary winding electrically insulated from the primary winding and outputting the output power.

10. The light emitting diode driver of claim 1, wherein the double voltage unit outputs the output voltage having two or more levels.

11. The light emitting diode driver of claim 9, wherein the output voltage of the double voltage unit maintains the same duty and cycle as the level of the output voltage changes.

12. A light emitting diode driver, comprising:
    a power supplying unit receiving an alternating current (AC) power and outputting a transformed power according to a predetermined ratio;
    a rectifying unit rectifying the output power from the power supplying unit;
    a double voltage unit including a capacitor element and a double voltage switching unit and receiving the rectified power from the rectifying unit and generating an output voltage such that the level of the output voltage is variable, and has constant duty and frequency; and
    a double voltage controlling unit having hysteresis characteristics, obtaining information regarding a level of the voltage supplied to the light emitting diode by the rectifying unit, and controlling the double voltage switching unit based on the information regarding the level of the voltage supplied by the rectifying unit.

13. The light emitting diode driver of claim 12, wherein the power supplying unit includes a transformer, the transformer having a primary winding receiving the received power and a secondary winding electrically insulated from the primary winding and outputting the output power.

14. The light emitting diode driver of claim 12, wherein the double voltage unit outputs the output voltage having two or more levels.

* * * * *